(12) United States Patent
Mueller

(10) Patent No.: US 7,004,185 B2
(45) Date of Patent: Feb. 28, 2006

(54) LIQUID LOADING TECHNIQUES

(75) Inventor: George E. Mueller, Kirkland, WA (US)

(73) Assignee: Kistler Aerospace Corporation, Kirkland, WA (US)

( * ) Notice: Subject to any disclaimer, the term of this patent is extended or adjusted under 35 U.S.C. 154(b) by 359 days.

(21) Appl. No.: 10/217,741

(22) Filed: Aug. 13, 2002

(65) Prior Publication Data

US 2003/0037819 A1 Feb. 27, 2003

Related U.S. Application Data

(60) Provisional application No. 60/313,277, filed on Aug. 17, 2001.

(51) Int. Cl.
*B67D 5/00* (2006.01)
*G01F 23/00* (2006.01)

(52) U.S. Cl. .......................... 137/1; 137/209; 137/334; 137/386; 137/571; 62/50.6; 62/50.7; 62/600; 62/608; 62/639

(58) Field of Classification Search ............ 137/1, 137/2, 209, 255, 334, 386, 571, 572, 583; 62/49.2, 50.4, 50.6, 50.7, 53.2, 600, 608, 62/639, 657; 141/59, 83
See application file for complete search history.

(56) References Cited

U.S. PATENT DOCUMENTS

| | | | |
|---|---|---|---|
| 3,938,347 A | 2/1976 | Riedel | |
| 4,023,717 A | 5/1977 | Schultz | |
| 4,334,410 A | 6/1982 | Drumare | |
| 4,699,339 A | 10/1987 | Rosen et al. | |
| 4,898,030 A | 2/1990 | Yeh | |
| 5,479,959 A | 1/1996 | Stotelmyer et al. | |
| 5,499,656 A | 3/1996 | Stotelmyer et al. | |
| 5,749,402 A | 5/1998 | Stotelmyer et al. | |
| 5,927,653 A | 7/1999 | Mueller et al. | |
| 6,644,920 B1 | 11/2003 | Beeck et al. | |

*Primary Examiner*—Kevin Lee
(74) *Attorney, Agent, or Firm*—Michael J. Donahue; Davis Wright Tremaine LLP

(57) ABSTRACT

An improved method for loading propellants into separate tanks on a reusable launch vehicle (RLV) uses three innovative methods. The liquid loading provides three liquid transfer methods, integrated and coordinated to provide less complicated loading and unloading operations, transfers, and cools and controls the liquids to provide a safe, cost effective solution to reusable vehicle tanking and de-tanking under commercial conditions. To insure the density of the propellant is maximized by cooling in a quick liquid loading environment, pre-cooling may be used.

24 Claims, 5 Drawing Sheets

LIQUID LOADING TECHNIQUES

CROSS-REFERENCE TO RELATED APPLICATIONS

This utility patent application claims the benefit of the filing of U.S. Provisional Patent Application Ser. No. 60/313,277, entitled Liquid Loading Techniques, filed on Aug. 17, 2001 and the specification thereof is incorporated herein by reference. This utility patent application also claims benefit from Disclosure Document Program File Number 391001, dated 15 Jan. 96 and 404230, dated 21 Aug. 96 and the specification thereof is incorporated herein by reference.

NO GOVERNMENT RIGHTS

No government funding, no government support or government contract or clause is related to this concept or patent application.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates generally to liquid transfer, measurement and temperature control of fluid loading using minimum ullage loading techniques. One application is the propellant loading of reusable launch vehicles.

2. Background Art

Liquids are transferred in many industries. The space launch industry offers a unique set of liquid loading challenges and requires innovative techniques to accomplish safe and cost effective transfer.

Originally, supercooled liquids used in expendable launch vehicles (ELVs) took days to transfer from storage to the launch vehicles prior to launch. The process depended on pumps, which broke down periodically further complicating the problems and the cost.

The transportation of cargo to space is expensive. Part of the problem is the high cost of the individual operations required for the transport of cargo to orbit. One of these individual operations is the liquid propellant transfer performed on the surface of the earth from the ground facility into the launch vehicle. The problem is further increased by the potential of a launch delay requiring the transfer of propellants back into the ground storage tanks and the related loss of pressurant gases, contamination of the liquids including cryogenic propellants and potential of equipment failures.

This liquid transfer problem has been partly addressed by various minor changes and patch like improvements to the thirty-year-old facilities used to launch early expendable launch vehicles (ELV's). Future generations of launch vehicles called the reusable launch vehicles (RLVs) are fully reusable and need an integrated liquid propellant loading process that is more cost effective, faster, safer and more reliable than existing liquid transfer methods. In future reusable space launch systems, the launch vehicle hardware, the ground liquid handling facilities, individual propellant liquids and some of the pressurant gas recovery procedures and techniques will all be designed, refined, enhanced and optimize to work together in an integrated manner with recovery of the liquids and gasses in a cost effective manner.

Previous propellant loading operations use cryogenic and other liquid mechanical pumps that are subject to breakdown and special re-circulating liquid cooling methods in the flight tanks due to the length of the wait on the launch pad. These systems use complicated liquid shut off instrumentation inside the tanks. These solutions are complicated and subject to breakdown at safety critical times in the propellant loading operation, which is already full of very critical tasks, instrumentation that is subject to failure and time sensitive problems. The pumps are also used in the de-tanking of the propellants, if an abort of the launch process on the launch pad is required. De-tanking usually wastes the pressurant gases and at times contaminates the propellant liquid. The propellant pumps are expensive and are a critical part of the propellant handling operations. Each critical component of hardware and instrumentation is usually duplicated to provide redundancy, if failure occurs.

Ullage is a small pressurant gas volume at the top of the tank and includes the region of interface between the uncontaminated liquid and the pressurant gas. Ullage is defined as the volume of a tank not used for useful propellant transport. This total of unused propellant volume for whatever reason is also called ullage and is a combination unused propellant and unused propellant volume in the tank. The objective of the liquid transfer process is to decrease the ullage to a practical minimum, but not to zero. The ullage volume goal is approximately 1% of the tank volume.

U.S. Pat. No. 4,023,717 to Schultz, et, al. entitled "Pressure-Operated Container for Viscous Products" discloses a piston and container used for unloading a food container using simple pressure and a slippery piston to expel viscous foods from a container. The '717 Patent is a limited temperature range, non-integrated transfer system focused on one industry. Gravity or pump feed is not mentioned in the '717 Patent and it is limited to non-cryogenic piston driven transfer of food using a single pressurant.

U.S. Pat. No. 5,499,339 to Rosen, et. al., and Whittmann, entitled "Apparatus and Method for Transporting a Spacecraft and a Fluid Propellant from the Earth to a Substantially Low Gravity Environment Above The Earth," discloses the transfer of bi-propellants from a stronger second tank into the lighter weight tanks of satellite payloads on orbit. The liquid transfer is only in microgravity and is not an integrated transfer system in one gravity focused on reusable vehicles. Gravity, pressure or pump feed is not mentioned and the '339 Patent is limited to bi-propellants.

U.S. Pat. No. 5,479,959 to Stotelmeyer, et. al., entitled "Integrated Storage and Transfer System and Method for Spacecraft Propulsion Systems" discloses a portable propellant loading cart for the ground loading of bi-propellants into satellites and focuses on the load cell measurement of bi-propellants loading into satellite payloads. The '959 Patent system is not an integrated transfer system focused on reusable vehicles. Gravity or pump feed is not mentioned and the process is limited to bi-propellants using a single pressurant. This invention appears to have reduced the loading process for a small amount of bi-propellant to about 17 days for the small satellite, where the present invention allows loading approximately ¾ of a million pounds of propellant in 2 to 14 hours. The '959, '656 and the '402 patents never mention gravity, pumps, or the recovery of consumable fluids or gasses.

U.S. Pat. No. 5,499,656 to inventors Stotelmeyer, et. al., entitled "Integrated Storage and Transfer System and Method for Spacecraft Propulsion Systems" discloses a later version of the portable propellant loading cart for the ground loading of propellants into satellites and focuses on the same load cell measurement of bi-propellants loading into satellite payloads as the '959 patent. The '656 Patent system is not an integrated transfer system focused on reusable vehicles, but a slower bi-propellant limited transfer process. Gravity or pump feed is not mentioned and the process is limited to bi-propellants using a single pressurant.

U.S. Pat. No. 5,749,402 to Stotelmeyer, et. al., entitled "Integrated Storage and Transfer System and Method for Spacecraft Propulsion Systems" discloses a later revision of the portable propellant loading cart for the ground loading of propellants into satellites and focuses on the same load cell measurement of bi-propellants loading into satellite payloads as the '959 and '656 Patents. This is a slower system bi-propellant limited transfer process. This is still not an integrated transfer system. The '402 Patent does add limited temperature conditioning focused on the spacecraft rather than reusable vehicles, but is limited to small spacecraft rather than launch vehicles. Gravity or pump feed is not mentioned and is limited to bi-propellants using a single pressurant.

Examples of cryogenic liquid transfer from other industries include the optical coating industry and methane tank service industry. U.S. Pat. No. 3,938,347 to Riedel, et. al., assigned to Optical Coating Lab, entitled "Level Control Apparatus and Method for Cryogenic Liquids" discloses cryogenic tanks, with level sensing means in the form of thermocouples and resistors inside the tank. Cryogenic temperatures in this Patent mean that everything put into the tank must be compatible with the cryogenic liquids.

Mixing instruments and LOX is a big compatibility issue and forces complicated expensive solutions. The thermocouples and resistors inside the tank also add weight to the tank. The thermocouples and resistors add complexity and another source of failure. An instrument subject to failure forces the designer to add a second sensor to increase the reliability of the system to detect an instrument failure versus an actual change. This modification generally solves the problem, but adds to the complexity, weight and cost of the vehicle.

The cryogenic liquid filling and ullage in other industries such as the methane industry is accomplished by placing instrumentation in the tank. For example, U.S. Pat. No. 4,334,410 to Drumare, entitled "Tank Designed to Contain a Liquefied Gas" discloses a system that uses methane tanks, which work at minus 160 degrees C. and typically get 98% full or 2% ullage. In filling methane tanks the heat responding device and the temperature responding element are placed inside the tank and are a source of extra expense. Each element of complexity is a source of failure.

Sometimes the cryogenic propellants are cooled as they are loaded into the launch vehicle, but the vehicle tanks are not usually efficient cryogenic containers and the temperature of the cryogenic propellants in the flight tanks at launch is elevated due to the heat and propellant loading waiting time. For this reason most launch vehicles solve the need for re-circulating cryogenic cooling systems in the flight tanks, because the propellant loading takes several days. This increases weight and makes the launch vehicle less efficient. The objective of the liquid loading or more accurate transfer of liquids in either direction is to accomplish the transfer with a minimum of time and delay with maximum safety. These new commercial launch vehicles are reusable and the propellant loading time is reduced, in this reduced duration propellant loading operation.

U.S. Pat. No. 5,644,920 to Lak, et. al, entitled "Liquid Propellant Densification" discloses super cooling of cryogenic liquid propellant, but not non-cryogenic propellants, such as Rocket Propellant One (RP-1). The '920 Patent system cools the propellant in the flight tanks and not in the storage tanks. The heat rejection from the liquid bulk fluid in the less temperature-efficient flight tanks and cooling is a relatively slow process. Cooling the propellant only in the thermally less inefficient flight tank as suggested in the '920 Patent means a slow ineffective fluid cooling process, use of significant re-circulation lines and an "in the tank Re-circulation Manifold." The tank hardware also includes the return line near the bottom of the flight tank. The "in the tank Re-circulation Manifold" requires support hardware and hangers inside the tank to support the extra hardware. All the hardware in board from the umbilical disconnect fitting interface actually increases the weight of the flight vehicle and reduces the payload weight of the vehicle. This is not an integrated transfer system using transfer, cooling and flow/level controls in an integrated process to reduce time, reduce cost, minimize hardware weight and increased safety on commercial reusable vehicles. Gravity or pump feeds are not mentioned and the '920 Patent system limits the propellants to the cooling of liquid oxygen and liquid hydrogen. The '920 Patent says little about pressurant gases. This system appears to add significant weight to the flight tank and does little to shorten the loading process, which increases the need for in the tank re-circulation cooling. The Rockwell '920 Patent never mentions gravity, pumps, or the recovery of consumable fluids in the de-tanking process.

Cryogenic propellant tanks typically have three volumes within the tank and each is a different temperature: First, the coldest cryogenic liquid is usually in the bottom of the tank; second, the liquid-gas interface region between the cryogenic liquid and the pressurant gas used to pressure feed or pressurize the propellant; and third, the actual pressurant gas. The reason for the pressurant gas under pressure is to force a propellant from storage to the flight tanks and later into a utilization location at the rocket engines.

Typically, the ground operations include the handling, monitoring, and effective use of all the liquids required for the transportation cycle to orbit. The total cost of the transportation cycle is in part the result of the ground operations, the cost-effective transfer of vehicle propellants at the ground facility, and the efficient use of the reusable vehicle and its propellants.

A number of other industries use cryogenic liquids and require transfer, pre-cooling and control systems for the liquid utilization. For example, the Methane Tank Liquefied Gas Filling uses systems that would benefit as would the Optical Coating Industry Cryogenic Systems.

In contrast, the present invention transfers liquid by three methods, cools it and controls the shut-off of the liquid filling without instruments in the cryogenic tank to measure the liquid levels.

Accordingly, several objects and advantages are the cost effective, reliable and safe liquid transfer using a combined or integrated operation containing three alternatives for a successful completion of the tasks.

SUMMARY OF THE INVENTION

In accordance with the liquid transfer system for the effective loading of fluids, the transfer system of the present invention has three techniques used in loading, cooling and controlling the liquid loading for a variety of uses.

Three methods of transferring liquid are used. One method of liquid transfer is the placement of storage tanks and the flight vehicle to permit the weight of the liquid to move the liquid from one tank to another tank. A second method is a low pressure pressurant gas differential used to push the liquid from one tank to another. A third method is a higher pressure in the pipe created by a pump; whereby one or more methods or combinations are used in an integrated method to complete the transfer of mass. The elevation difference is controlled by a series of valves and pipes in an integrated and controlled manner. The elevation difference can include the pre-cooling of the liquid. The elevation difference can include a method of sensing and controlling the level of the liquid in the final tank. The pressurant gas pressure differential can include nitrogen, but is not limited to gaseous oxygen ("GOX") and helium. The transfer of the liquid is from one tank to another by a series of valves and pipes in an integrated and controlled manner.

The moving of liquid by elevation differential is used to permit the weight of the liquid to move the liquid from one tank to another including a method of sensing and controlling the level of the liquid in the final tank. The lower pressure created by the pump is controlled by a method of sensing and controlling the level of the liquid in the final tank.

The present invention comprises a method of sensing and controlling the level of the liquid flow into a tank. This method comprises an inflow pipe permitting a liquid flow into a tank; a vent pipe permitting a liquid and/or gas flow from the tank; a visual method of sensing the liquid out flow from the vent pipe; and a method of calculating the correct elevation of the vent pipe.

The next step is setting the elevation of the vent pipe elevation precisely to accomplish a precise ullage or remaining gas volume in the top of the tank whereby the ullage control is integrated into the liquid transfer process. The method of controlling the liquid flow into a tank is improved by adding a coordinated series of valves and pipes in an integrated and controlled manner. The method of controlling the liquid flow into a tank uses an elevation differential to permit the weight of the liquid to move the mass. The liquid flow is also transferred with pressurant gas differential at low pressure and used to push the liquid from one tank to another. The liquid flow into a tank is also transferred with a lower pressure in the pipe created by a pump.

The present invention uses the method of pre-cooling a transferring liquid by cooling the liquid in the storage tank. Also used is the bubbling of cold helium as the ullage gas in the final tank to eliminate the collapse of the ullage volume. The pre-cooling is furthered by the loading of the liquid from the bottom of the final tank to prevent stagnation and geysering and the combined methods of pre-cooling are used as an integrated method of completing the transfer of mass. The volume where the elevation difference is used as a method of liquid transfer also uses sensing and controlling techniques to detect the level of the liquid in the final tank. The volume of liquid is transferred with a pressurant gas pressure differential used to push the liquid from one tank to another, also using sensing and controlling techniques to detect the level of the liquid in the final tank. The volume of liquid is transferred using a method of creating a lower pressure in the pipe created by a pump, also using sensing and controlling techniques to detect the level of the liquid in the final tank.

The loading of liquids is a complex, time consuming operation at a time that is already full of many critical fluid loading tasks of four separate tanks on a two-stage reusable launch vehicle. The use of the present invention provides numerous advantages. Likewise, the present invention is useful for fluid handling in other industries using cryogenic fluid liquid loading, including:

liquid transfer in both directions with integrated methods including
  gravity
  pressure
  rotating mechanical pumps
  using three possible pressurant gases in an innovative manner so as to allow de-tanking and recovery of expensive consumables,
  nitrogen
  gaseous oxygen or GOX
  helium
cryogenic and other liquid measurement using an approximately 1% ullage method and
temperature control using pre-supercooling of the rocket propellants at the ground facilities.

A primary object of the present invention is the transfer of liquids from one location to another.

A primary advantage of the integrated method of liquid transfer in both directions is the cost effective, efficient and safe liquid loading using combinations of integrated flow methods, multiple pressurant gas, simplified non-instrument measurement techniques and pre-supercooling.

Another advantage of the invention is an operation that all works together in an integrated manner to accomplish the transfer, supercooling and measurement of the propellant loading operation.

Another advantage is liquid transfer accomplished with a minimum of delay from the storage tanks using one or more of three possible methods including gravity, pressure and other rotating mechanical pumps.

Another advantage is the pressurant gas is three possible types of pressurant gases, in an integrated manner, which allows more flexibility in the operations.

Another advantage is the flexibility allowed in de-tanking and recovery of the expensive propellants and consumables including nitrogen, gaseous oxygen (GOX) and helium.

Another advantage is cryogenic and other propellant liquid level measurement methods and vent hardware in the tank accomplishing an approximate 1% ullage solution, which pre-pressurizes the ullage volume and provides an indication of the approximate 1% fill level in such a manner, so as to make the operation more safe and effective.

Another advantage is the temperature control using pre-supercooling of the liquids with precision control system sensing liquid levels without in flight tank sensors.

Another advantage is the temperature control using pre-supercooling of the liquids with a single pipe precision control and cost effectiveness.

Another advantage is the pre-cooling of the fluids in the storage tanks which minimizes the extra hardware inside the flight tanks.

Another advantage is the re-circulating cooling capability of a storage tank operation, which is not time critical, rather than cooling the cryogenic liquids in the flight tank where the process slows the ground operations.

Other objects, advantages and novel features, and further scope of applicability will be set forth in part in the detailed description to follow, the Propellant Transfer System drawings taken in conjunction with the accompanying drawings FIG. 1 through FIG. 5, and in part will become apparent to those skilled in the art upon examination of the following, or may be learned by practice of the invention. The objects and advantages of the invention may be realized and attained by means of the process instrumentation, instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
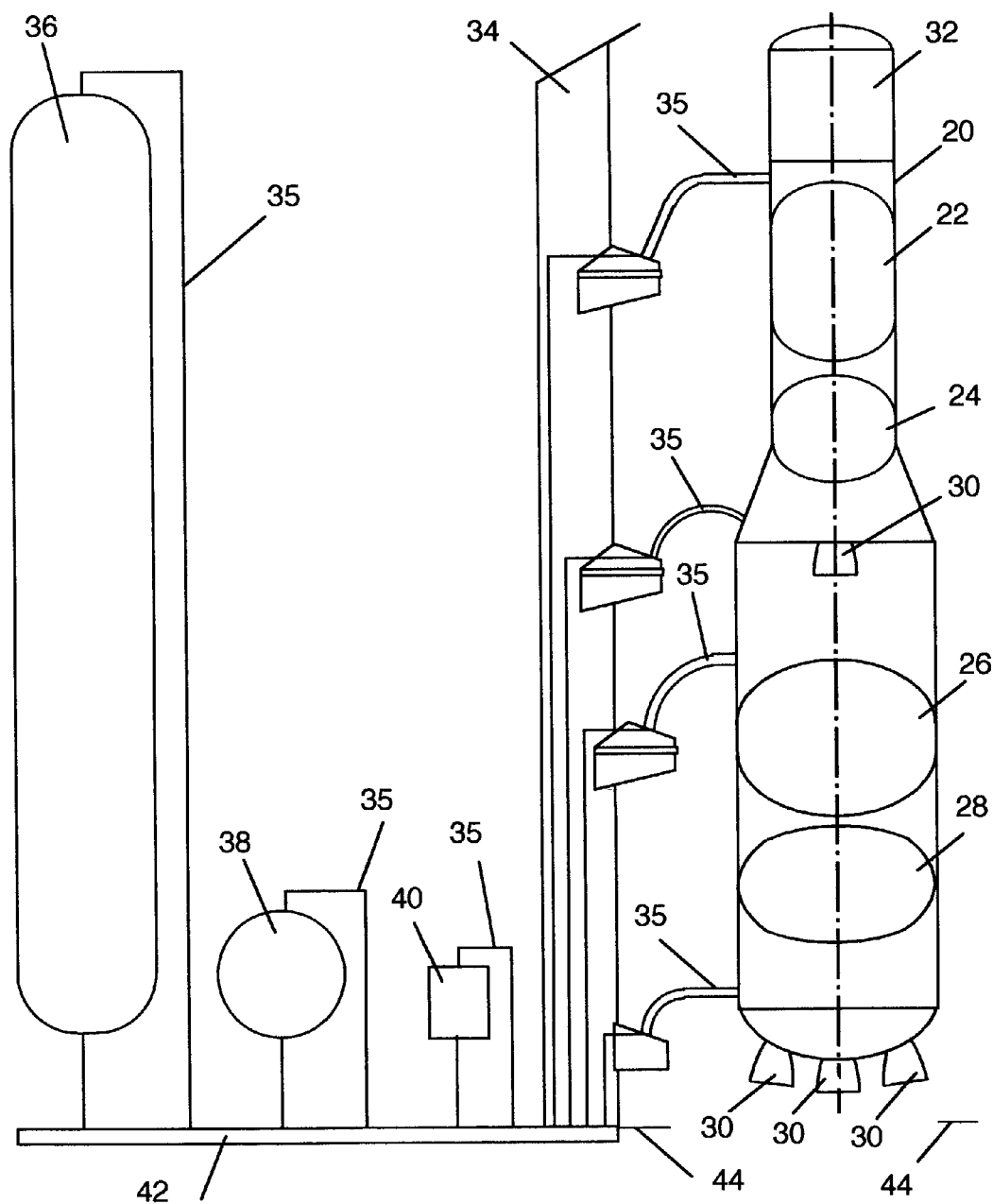
FIG. 1 is the liquid transfer on a reusable launch vehicle (RLV)

REFERENCE NUMERALS IN DRAWINGS 20 launch vehicle
22 second stage vehicle liquid oxygen propellant (LOX) tank
24 second stage vehicle rocket propellant (RP) tank
26 first stage vehicle liquid oxygen propellant (LOX) tank
28 first stage vehicle rocket propellant (RP) tank
30 rocket engine
32 payload bay
34 umbilical tower
35 propellant loading piping loop
36 liquid oxygen (LOX) storage
38 rocket propellant (RP) storage
40 heat exchangers
42 pipe run
44 launch pad
46 vehicle transport alignment rails
48 vehicle processing facility (VPF)
50 pressurant gas storage
52 helium pressurant gas storage
54 gaseous liquid oxygen (LOX) or gaseous oxygen (GOX) pressurant gas storage
56 heat exchanger for liquid oxygen (LOX)
58 pump for liquid oxygen (LOX)
60 nitrogen pressurant gas storage
62 heat exchanger for rocket propellant (RP)
64 pump for rocket propellant (RP)
66 tank pressurization line
68 tank pressurization line valve
70 tank vent line
72 tank vent valve
74 ullage distance—actual
76 diffuser
78 liquid level—actual
80 height for 1% ullage
82 1" error effect
84 liquid level desired for the present invention
88 tank fill line
90 tank fill valve DESCRIPTION OF THE PREFERRED EMBODIMENTS (BEST MODES FOR CARRYING OUT THE INVENTION)

The liquid loading system of the present invention is directed to enhancing liquid transfer technology and its use in various industries, including launch vehicle technologies. The present innovation provides a more cost-effective vehicle.

Reference is now made to FIG. 1, which illustrates a preferred embodiment of the invention. FIG. 1 is side view of launch vehicle 20 for transporting payloads or cargo to space. Launch vehicle 20 is single stage vehicle, two-stage vehicle or multi-stage vehicle, which is expendable after launch or reusable on future launches. FIG. 1 illustrates side view of propellant loading transfer. Cryogenic propellant liquid oxygen tank 22 is located inside launch vehicle 20 and contains LOX at −310+ degree F. propellant that is highly flammable and difficult to handle. Liquid oxygen tank 22 and rocket propellant (RP) tank 24 are connected to rocket engine 30 in a stage or section of launch vehicle 20 in which it resides. First stage vehicle liquid oxygen propellant (LOX) tank 26 contains LOX. Rocket propellant tank (RP) 28 is connected to rocket engine 30. First stage vehicle rocket propellant (RP) tank 28 contains dense kerosene or other liquid propellant and is connected to rocket engine 30. A dense kerosene or other liquid propellant or fuel from first vehicle rocket propellant (RP) tank 24 is combined with liquid oxygen or LOX from tank 28 in engine 30 to provide thrust for launch vehicle 20 to transport customer mass or payload in payload bay 32 to orbit. An umbilical tower 34 supports various fluid interfaces and loading operations for launch vehicle 20 being filled for launch. Umbilical tower 34 supports propellant loading piping loop 35 in vertical near launch vehicle 20 and pipe tunnel 42 supports propellant loading piping loop 35 in a horizontal configuration and to a connection to propellant storage locations. Propellant from various ground storage tanks is transported to launch vehicle 20 through propellant loading piping loop 35 using various propellant loading innovation including three of which are the subject of this invention.

Liquid oxygen (LOX) storage 36 transports propellant liquid through propellant loading piping loop 35 supported on horizontal pipe run 42 vertical umbilical tower 34. Rocket propellant (RP) storage 38 transports propellant through propellant loading piping loop 35 supported on horizontal pipe run 42 and vertical umbilical tower 34. Heat exchanger 40 cools propellant through propellant loading piping loop 35 supported on horizontal pipe run 42 and vertical umbilical tower 34. Launch vehicle's 20 four tanks 22, 24, 26 and 28 are filled with propellants through four propellant loading piping loops 35 as it sits vertical preparing for launch. Launch vehicle 20 sits on launch pad 44 and is filled with propellants.

Figure 2:
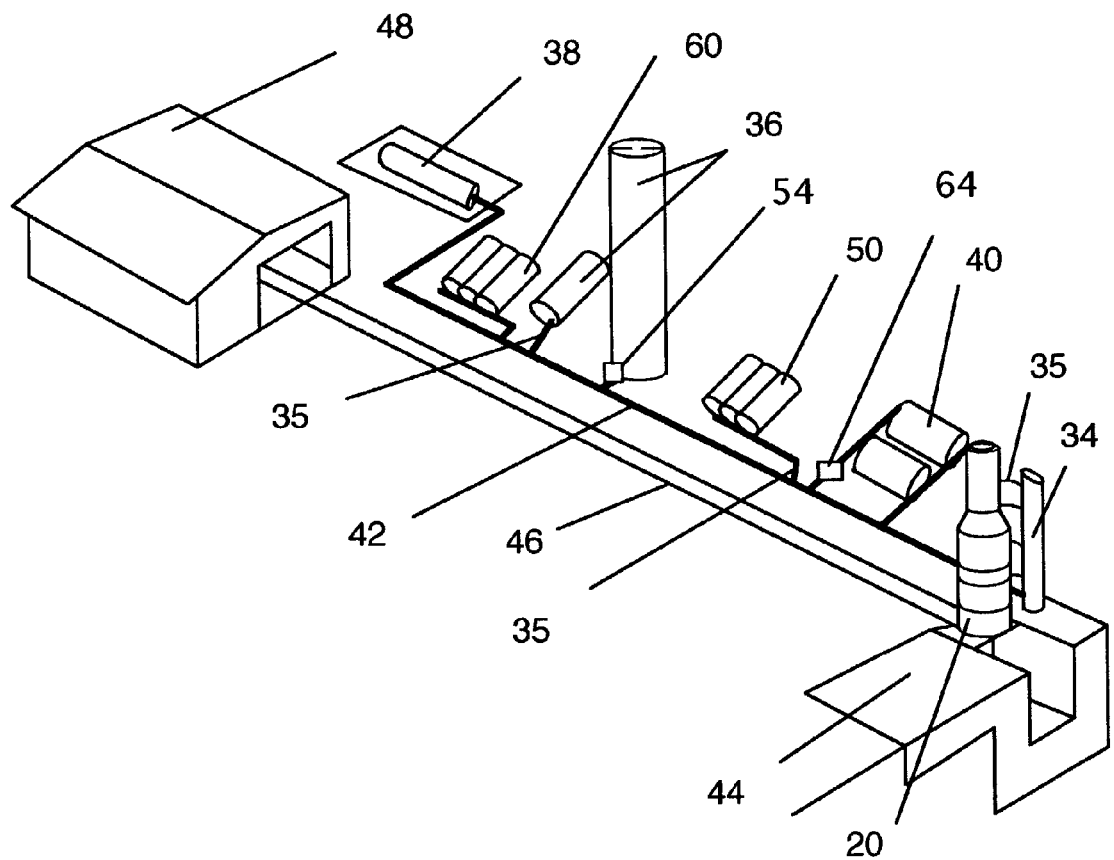
FIG. 2 is an RLV ground facility with liquid loading utilized.

FIG. 2 is a perspective view of a launch vehicle ground facility with vehicle processing facility 48 depicting major components of propellant storage and transfer equipment showing general tank layout with piping layout at various locations around vehicle pad operations area. Propellant is delivered to a site in tanker trucks and stored on site. Launch vehicle 20 is connected to an umbilical tower 34 through propellant loading piping loop 35 leading through pipe run 42 to various propellant storage and enhancing locations. Launch vehicle 20 is placed in launch position on launch pad 44 for propellant loading. Vehicle processing facility (VPF) 48 prepares launch vehicle 20, which is transported to launch pad 44 on alignment rails 46.

Liquid oxygen (LOX) storage 36 and rocket propellant (RP) storage 38 transports propellant through propellant loading piping loop 35 supported on horizontal pipe run 42 and vertical umbilical tower 34. When pump 64 for rocket propellant (RP) is used, the flow of liquid is to or from rocket propellant storage 38 to or from launch vehicle 20. Heat exchangers 40 cool propellant through propellant loading piping loop 35 supported on horizontal pipe run 42 and vertical umbilical tower 34. Launch vehicle's 20 four tanks 22, 24, 26 and 28 are filled with propellants through propellant loading piping loop 35 after launch vehicle 20 is placed vertical in preparation for launch. Pressurant gas storage 50 is used to transport liquid oxygen (LOX) storage 36 and rocket propellant (RP) storage 38 through propellant loading piping loop 35 when pressure is used as a method of transfer from storage to launch vehicle 20. Pressurant gas storage 50 is one of several pressurant gases including gaseous liquid oxygen (LOX) or gaseous oxygen (GOX) pressurant gas storage 54. Nitrogen pressurant gas storage can also be used as method of transferring liquids to launch vehicle 20. Nitrogen pressurant gas storage 60 is connected to pipe run 42.

Figure 3:
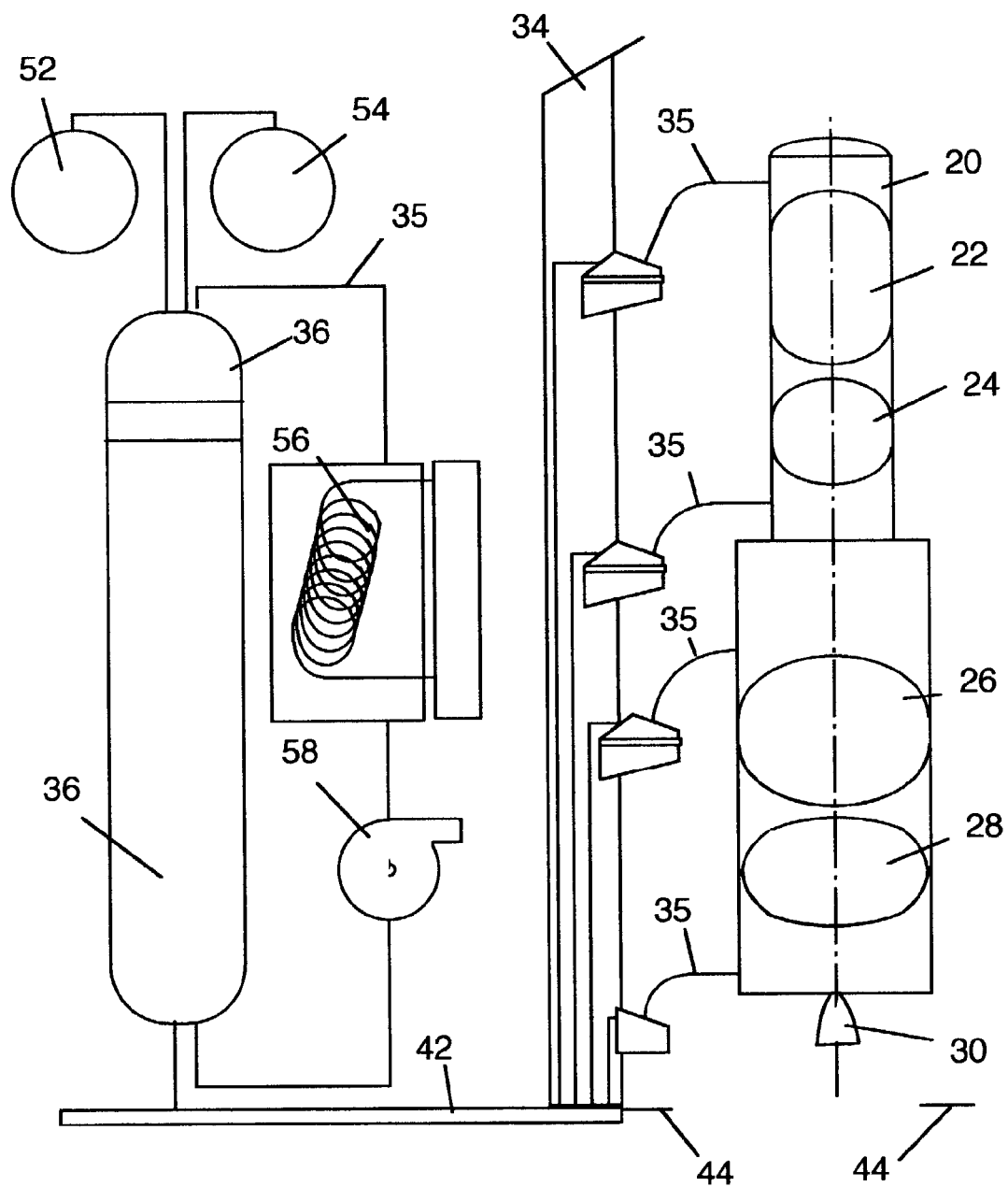
FIG. 3 is liquid oxygen (LOX) propellant loading with liquid loading utilized.

FIG. 3 is side view of LOX propellant loading for launch vehicle 20 with systems used to transfer −310 degree F. liquid oxygen propellant to launch vehicle 20. FIG. 3 illustrates second stage cryogenic propellant liquid oxygen tank 22 and first vehicle liquid oxygen propellant (LOX) tank 26 located inside launch vehicle 20 and contains LOX at −310+ degree F propellant that is highly flammable and difficult to handle. Second stage cryogenic propellant liquid oxygen tank 22 and first stage vehicle liquid oxygen propellant (LOX) tank 26 are connected to rocket engine 30 to supply oxidizer in flight and to liquid oxygen (LOX) storage 36 in propellant transfer phase via propellant piping loop 35 attached to umbilical tower 34, leading to pipe run 42.

Some previous liquid oxygen systems re-circulate LOX in vehicle tank 20 to cool it, which is a very slow process in a minimum thermal effective tank. In contrast, present innovation re-circulates LOX in storage phase, where cooling time is not critical and storage tank is more efficient as a cryogenic container present innovation removes pump for LOX 58 from actual liquid loading process. Heat rejection from liquid bulk fluid in less efficient flight tanks is a relatively slow process, when it is not pre-supercooled before being transferred to flight tank and when entire propellant transfer process takes days instead of hours. Liquid oxygen (LOX) storage 36 is coupled with heat exchanger for LOX 56 and pump for LOX 58 to create a cooling loop capable of being controlled and used as required to meet launch and storage demands. Liquid loading removes cooling of liquid from critical tasks in a launch process and includes providing reduced hardware weight flight vehicle 20 and permits shorter propellant transfer in range of approximately 12 hours.

first transfer method of liquid transfer is gravity. One example of liquid oxygen (LOX) storage 36 is a large tank approximately 100 feet high and 10 feet in diameter, which means some portion of propellant transfer each way is accomplished by gravity depending on a relative elevation of a vehicle tank and different storage tank stage.

second method of liquid transfer uses one or more pressurant gases, helium pressurant gas storage 52 and other gaseous LOX or GOX pressurant gas storage 54 to force low pressure LOX from storage tank system in a low pressure range. Propellant liquid in flight tanks is at relatively low pressure in the range of 20 to 100 psia and pressurant gas is stored on board flight vehicle in high-pressure tanks in the range of 6,000 psia. A third system for liquid transfer uses pump 58 for LOX and valving to move a liquid propellant as required.

Figure 4:
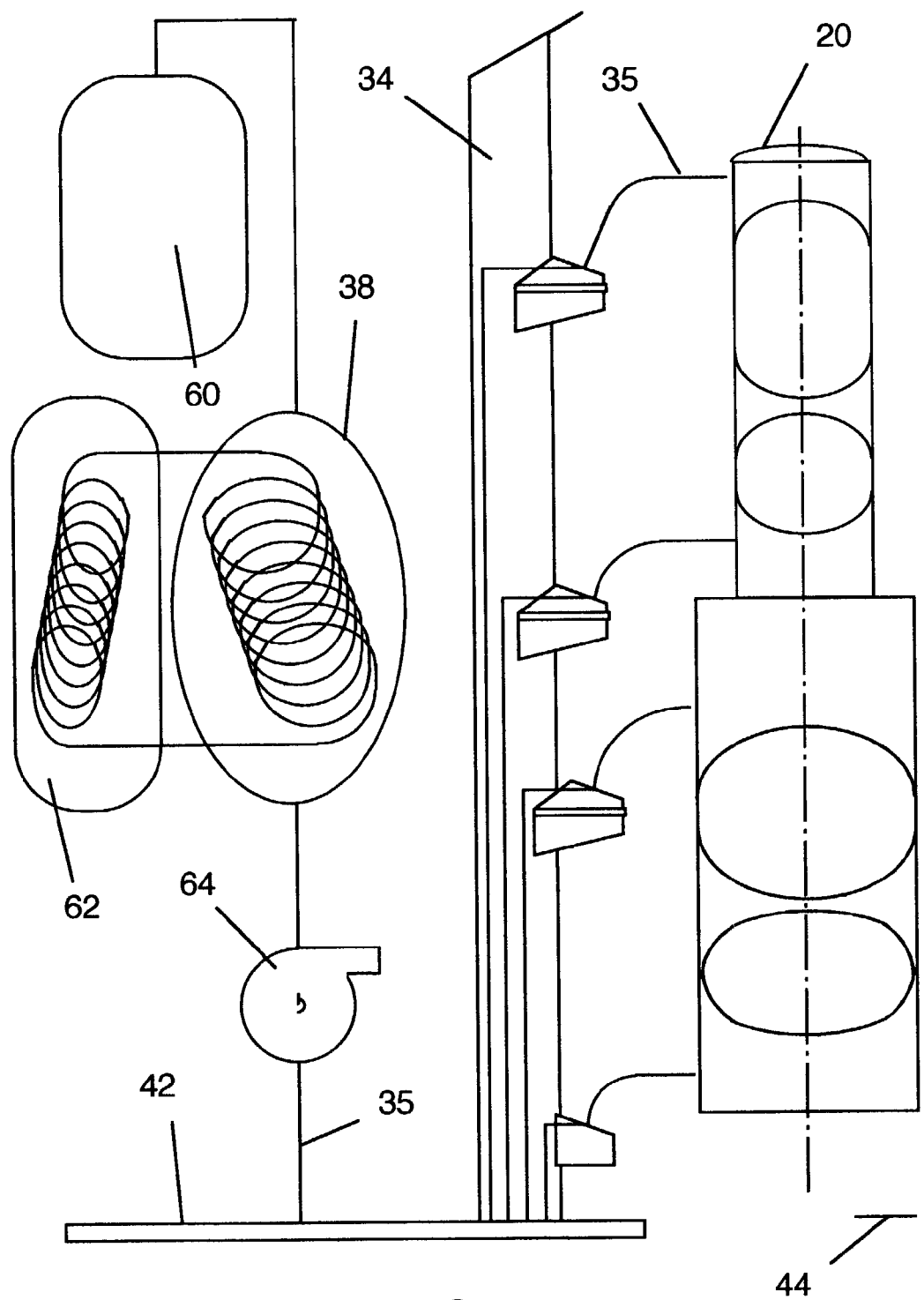
FIG. 4 is rocket propellant (RP) propellant loading with liquid loading utilized.

FIG. 4 is side view of rocket propellant (RP) loading for launch vehicle 20 with propellant loading piping loop 35 layout in piping run 42 and heat exchanger for RP 62 around vehicle pad 44 operations area. Rocket propellant (RP) is dense kerosene or liquid fuel and is cooled to −30 degree F. by heat exchanger for RP 62 and is transferred to and from rocket propellant storage location 38 and vehicle as required using gravity, pressurant and/or pumps. When pump for rocket propellant (RP) 64 is used, flow of liquid is to or from rocket propellant storage 38 to or from launch vehicle 20. Umbilical tower 34 supports piping loop 35 in the area of launch pad 44 and in piping run 42, so rocket propellant (RP) is forced from rocket propellant (RP) storage 38 by nitrogen pressurant gas storage 60.

Figure 5:
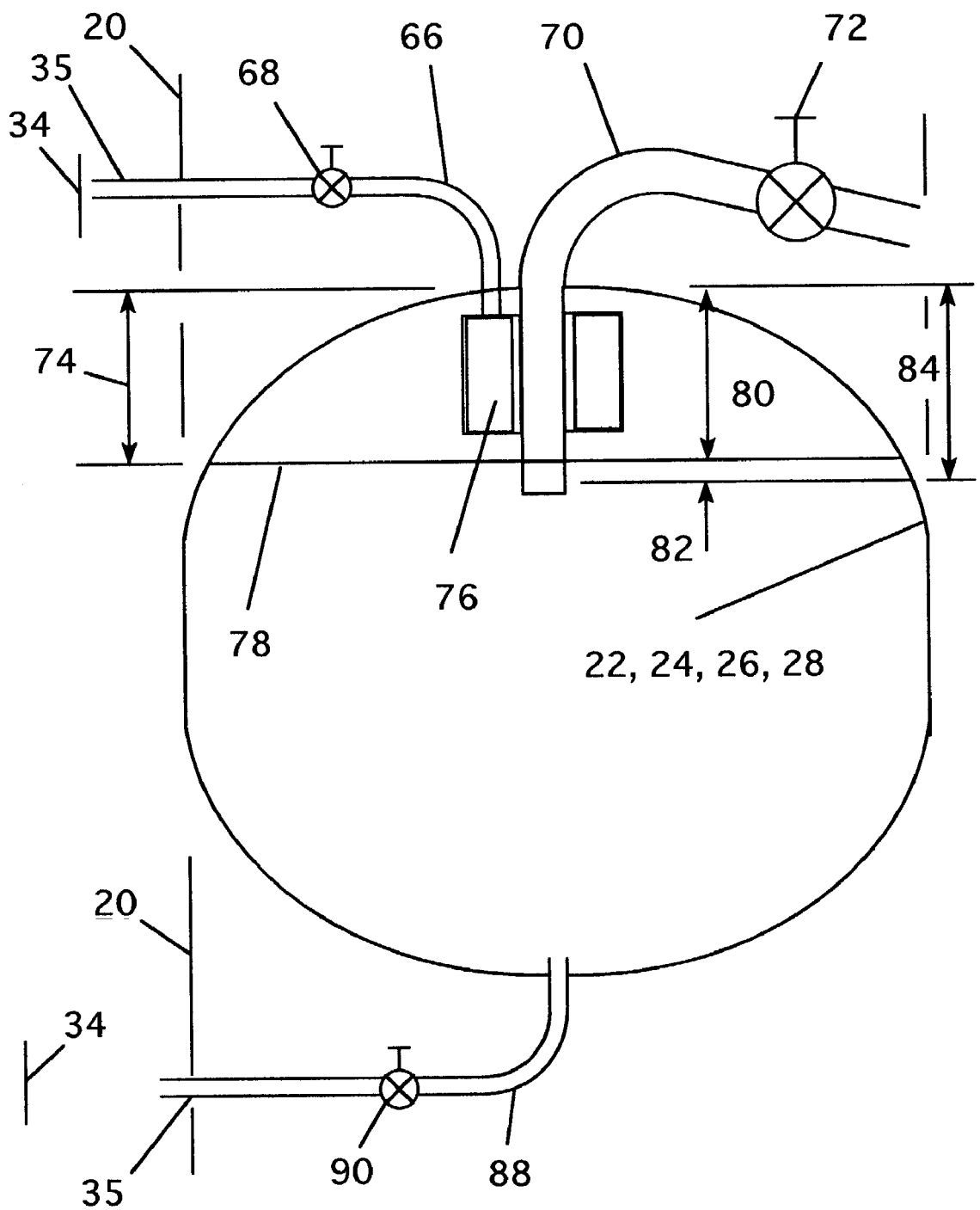
FIG. 5 is the ullage method for measuring and completing liquid loading.

FIG. 5 illustrates a preferred 1% range ullage for measuring and completing propellant loading for launch vehicle 20 with piping layout around a typical top of a vehicle tank. The present invention also pre-compresses remaining ullage volume. In launch vehicle 20, second stage vehicle liquid oxygen propellant (LOX) tank 22, second stage vehicle rocket propellant (RP) tank 24, first stage vehicle liquid oxygen propellant (LOX) tank 26 and first stage vehicle rocket propellant (RP) tank 28 accepts propellant from an umbilical tower 34 through propellant loading piping loop 35 outside launch vehicle 20 and becomes tank loading pressurization line 66. Flow is regulated by tank pressurization line valve 68, which is opened or closed. Liquid comes into tanks pushed by gravity, one or more pressurant gases or pumps and cooled to an extent possible for each propellant type, but sensing top of liquid actual 78 and timing exact shut off of propellants is difficult. Spillage of liquid is a safety and damage hazard. Propellant comes in tank fill line 88 when tank fill valve 90 is opened. The propellant level is rising with warmer propellant at the top until it flows out vent line 70. Filling and flow out the vent line continues until the temperature of outflow reaches desired propellant temperature. Since the tank is filled from the bottom and the warmer propellant is flowing out vent line 70, all propellant in the tank is cooler than the measured outflow temperature. Helium is available through pressurization line 66 from its respective storage location and is diffused by diffuser 76 if tank ullage pressure needs to be increased.

One problem is that some gas must be left in the top of a tank, so the tank cannot be filled completely. A problem is establishing the precise liquid level or the distance from the top of a tank to liquid level or height for a range of ullage distance with most preferably 1% ullage 80. This height of stand pipe for ullage 80 is a function of several things including a tank geometry and a volume of diffuser 76, but is determined prior to propellant loading for each tank. For launch vehicle 20 the chart in the Examples indicates height for 1% ullage 80 and 1 inch error effect percentage and required control response for 5 psia.

A problem in previous propellant loading operations is that fluid transfer is a time consuming cycle. The flow direction usually has to be reversed at times when the launch is scrubbed and some or all of the consumables are lost or contaminated beyond reuse, because the time is weeks instead of hours.

The present invention solves these problems. The propellant loading of the present invention uses several different methods for the movement of propellant to and from the vehicle.

Propellant is loaded through the use of gravity and ullage pressure in the ground storage tank. This process is reversed if detanking is required by pressurizing the flight tanks and lowering the ullage pressure in the ground tanks which refills the ground tank from the flight tank.

A typical site is located in such a manner that the propellants are either loaded or unloaded by gravity and ullage pressure and excludes pumps or very few items of hardware that can fail, except some valves and piping. This simplicity is important for both the loading operations and in the event the launch is delayed and the de-tanking is required, where the propellants are to be removed from the vehicle tanks with a minimum of time and loss of propellant, pressurant gas and temperature/pressure. The most complex fluid transfer method is by pump.

Other industries have similar problems in determining the end of the filling cycle on cryogenic tanks for a number of reasons and have some complex solutions. The methane transporter tanks use "in the tank" heat response devices to detect the difficult to define and to detect level of cryogenic liquid level. Such heat response devices add unwanted weight and complexity to the fluid transfer. The present invention solves these problems.

The density of the propellant is an issue. The denser the propellant the more energy contained in a smaller volume and the less tankage is required to contain it. The densification of liquids is done in the present invention using pre-cooling in the storage tanks, using the vacuum jacketed lines, and the use of flight tank cryogenic pressurant, such as helium, stored on the vehicle in separate high pressure bottles in the range of 6,000 psi in the vehicle. The traditional system (e.g., '920 Patent) cools the cryogenic flight tank partly, because the time of loading is a long duration. The liquid loading technique used in the present invention pre-cools cryogenic and non-cryogenic liquids in the storage tank.

The ullage or wasted propellant volume and propellants should be kept to a minimum with 1% set as the goal. To achieve this with cryogenic propellants requires the solution, of the present invention. As the cryogenic propellant is loaded under gravity, pressure or rotating equipment, the difficulty is in determining when a tank is full and to not spill cryogenic propellants, because LOX freezes everything it touches and burns everything flammable. The 1% ullage in the present application detects the liquid coming out of the open end of the tank vent pipe 70 as an indication the tank vent valve is to be closed and this action pre-pressurizes the ullage in the tank with no "in the tank" instrumentation and one small length of pipe.

METHODS, USES, INDUSTRIAL APPLICABILITY

The invention is further illustrated by the following non-limiting examples.

Rocket Propellant Loading System

In reusable rocket launch systems, reduced complexity, increased reliability, speed and cost are all issues of importance. Removing instrumentation from the inside of the flight tank removes weight, complexity and the chance the instrumentation will fail over 100 or more re-uses of the vehicle. The filling of a tank with cryogenic fluids is always difficult, because it is difficult to determine the fill level given the three phases of the fluid and the amount of non-fluid in the top of the tank.

Operational liquid transfer requires a certain percentage volume with a height for 1% ullage 80, then tank vent line 70 is set by precise distance off the top of tank, so vent line 70 flows liquid at the precise time to provide ullage when shut off. If, for example, the launch vehicle industry requires a control response for 5 pounds per square inch, then a one-inch error in placement of pipe elevation results in a one-inch error effect 82. One inch error effect 82 for placement of bottom elevation of tank vent line 70 is seen as the difference between ullage distance 74 and desired liquid level 84.

For example in the launch vehicle industry, height for 1% ullage 84 is a calculated distance. When compared to actual ullage distance 74 it can have an effect on control response for 5 psia if placement is one inch off and is depicted in the chart below:

| Chart Item, | Height For 1" 1% Ullage 80, | Effect 82, | Control Response for 5 psia |
| --- | --- | --- | --- |
| Second Stage Vehicle Liquid Oxygen Propellant (LOX) Tank 22 | ~10.9 inches | 0.18% | 0.2 seconds |
| Second Stage Vehicle Rocket Propellant (RP) Tank 24 | ~8.6 inches | 0.27% | 0.2 seconds |
| First Stage Vehicle Liquid Oxygen Propellant (LOX) Tank 26 | ~11.4 inches | 0.18% | 0.14 sec |
| First Stage Vehicle Rocket Propellant (RP) Tank 28 | ~7.3 inches | 0.27% | 0.14 sec |

Supercooling of each propellant increases the density of the liquid and permits more fluid in a tank. This increases the vehicle's efficiency and ultimately increases the payload of the space launch vehicle.

The present invention has a small pressurant gas volume at the top of the tank and the region of interface between the uncontaminated liquid and the pressurant gas plus the unrecoverable propellant if any, means that a portion of the volume is not used for useful propellant transport. This total of unused propellant for whatever reason is called ullage. The objective of the liquid transfer process is to decrease the ullage to a practical minimum, but not to zero. The ullage volume goal is approximately 1% of the tank volume. After launch, no real control is exerted on the size of ullage of each tank of reusable launch vehicle (RLV). All influence on the ullage must be exerted before the launch and during propellant loading phases of the ground operation of the vehicle. The control of the size of the ullage volume lowers to the cost of the tankage, vehicle weight and other cost growth.

The ground operations include the handling, monitoring, and effective use of all the propellants required for the transportation cycle to orbit. The total cost transportation cycle is in part the result of the cost of the ground operations, the cost effective transfer of vehicle propellants at the ground facility and the efficient use of the reusable vehicle and propellants.

Other Industries

The present invention is useful for liquid filling and ullage in other industries such as the optical coating industry, liquefied gas filling (e.g., methane) and other industries where the controlling of the filling task is accomplished by placing instrumentation in the tank.

The preceding examples are repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications will be obvious to those skilled in the art and it is intended to cover in the appended claims all such modifications and equivalents. The entire disclosures of all references, applications, patents, and publications cited above are hereby incorporated by reference.

What is claimed is:

1. A method of transferring liquid comprising:
   a. a elevation differential used to permit the weight of the liquid to move the liquid from one tank to another, and
   b. a pressurant gas pressure differential used to push the liquid from one tank to another, and
   c. a lower pressure in the pipe created by a pump,
   whereby one or more of said combination is used in an integrated method to complete the transfer of mass.

2. The method of claim 1 wherein said elevation difference is controlled by a series of valves and pipes in an integrated and controlled manner.

3. The method of claim 1 wherein said elevation difference could include the pre-cooling of the liquid.

4. The method of claim 1 wherein said elevation difference could include a method of sensing and controlling the level of the liquid in the final tank.

5. The method of claim 1 wherein said pressurant gas pressure differential could include nitrogen.

6. The method of claim 1 wherein said pressurant gas pressure differential could include gaseous oxygen called GOX.

7. The method of claim 1 wherein said pressurant gas pressure differential could include helium.

8. The method of claim 1 wherein said transfer the liquid from one tank to another by a series of valves and pipes in an integrated and controlled manner.

9. The method of claim 1 wherein said moving liquid by elevation differential used to permit the weight of the liquid to move the liquid from one tank to another including a method of sensing and controlling the level of the liquid in the final tank.

10. The method of claim 1 wherein said lower pressure created by the pump is controlled by a method of sensing and controlling the level of the liquid in the final tank.

11. The method of claim 1 wherein said lower pressure created by a pressurant gas pressure differential used to push the liquid from one tank to another controlled by a method of sensing and controlling the level of the liquid in the final tank.

12. A method of sensing and controlling the level of the liquid flow into a tank comprising:
   a. an inflow pipe permitting a liquid flow into a tank and,
   b. a vent pipe permitting a liquid and gas flow from the tank, and
   c. a visual method of sensing the liquid out flow the vent pipe, and
   d. a method of calculating and setting the elevation of the vent pipe elevation precisely to accomplish a precise ullage or remaining gas volume in the top of the tank, whereby said ullage control is integrated into the liquid transfer process.

13. The method of controlling the liquid flow into a tank of claim 12 wherein said method is improved by adding an coordinated series of valves and pipes in an integrated and controlled manner.

14. The method of controlling the liquid flow into a tank of claim 12 wherein said liquid is transferred with an elevation differential used to permit the weight of the liquid to move the liquid from one tank to another.

15. The method of controlling the liquid flow into a tank of claim 12 wherein said liquid is transferred with a pressurant gas pressure differential used to push the liquid from one tank to another.

16. The method of controlling the liquid flow into a tank of claim 12 wherein said liquid is transferred with a lower pressure in the pipe created by a pump.

17. A method of pre-cooling a transferring liquid to include:
   a. cooling the liquid in the storage tank, and
   b. bubbling cold helium as the ullage gas in the final tank to eliminate the collapse of the ullage volume, and
   c. the loading of the liquid from the bottom of the final tank to prevent stagnation and gysering,
   whereby said pre-cooling will be used in an used in an integrated method of completing the transfer of mass.

18. The volume of claim 17 wherein said elevation difference could include a method of sensing and controlling the level of the liquid in the final tank.

19. The volume of claim 17 wherein said liquid is transferred with a pressurant gas pressure differential used to push the liquid from one tank to another.

20. The volume of claim 17 wherein said liquid is transferred could include a method of creating a lower pressure in the pipe created by a pump.

21. A method of transferring liquid from a first tank to a second tank using one or more pipes, comprising:
   an elevation differential between the first tank and the second tank to permit the weight of the liquid to move the liquid from the first tank to the second tank;
   a pressurant gas pressure differential used to move the liquid from the first tank to the second tank; and
   a pressure differential in the pipe coupling the first and second tanks created by a pump to move the liquid from the first tank to the second tank, whereby one or more of the elevation differential, the pressurant gas pressure differential and the lower pressure created by the pump is used in an integrated method to complete the transfer of liquid from the first tank to the second tank.

22. The method of claim 21, further comprising moving the liquid from the second tank to the first tank using one or more of the combination of elevation differential, pressurant gas pressure differential and lower pressure created by the pump.

23. The method of claim 21 wherein the elevation differential is controlled by a series of valves and pipes in an integrated and controlled manner.

24. The method of claim 21 wherein the pressurant gas pressure differential is provided by a gas selected from a group comprising helium, nitrogen and GOX.

* * * * *

UNITED STATES PATENT AND TRADEMARK OFFICE
CERTIFICATE OF CORRECTION

PATENT NO. : 7,004,185 B2
APPLICATION NO. : 10/217741
DATED : February 28, 2006
INVENTOR(S) : George E. Mueller It is certified that error appears in the above-identified patent and that said Letters Patent is hereby corrected as shown below:

On the Title Page, Item (75), should read,

--Donald L. Fagan, Fallbrook, CA (US), Warren K. Lackie, Melbourne, FL (US), Bill A. Tolson, Melbourne, FL (US), Charles D. Limerick, Issaquah, WA (US)--

Signed and Sealed this

Thirty-first Day of July, 2007

JON W. DUDAS
*Director of the United States Patent and Trademark Office*